United States Patent
Lucas et al.

(10) Patent No.: US 7,618,237 B2
(45) Date of Patent: Nov. 17, 2009

(54) WIND DRIVEN POWER SYSTEM

(76) Inventors: Brandon W. Lucas, 336 Good Neighbors Rd., Check, VA (US) 24072; Daniel W. Lucas, 336 Good Neighbors Rd., Check, VA (US) 24072

( * ) Notice: Subject to any disclaimer, the term of this patent is extended or adjusted under 35 U.S.C. 154(b) by 417 days.

(21) Appl. No.: 11/367,287

(22) Filed: Mar. 3, 2006

(65) Prior Publication Data

US 2008/0199314 A1   Aug. 21, 2008

(51) Int. Cl.
*F03D 3/06*   (2006.01)
(52) U.S. Cl. .............. 416/119; 416/132 B; 416/140; 416/907
(58) Field of Classification Search ........... 416/118, 416/119, 111, 132 B, 140; 415/907, 4.2, 415/4.4

See application file for complete search history.

(56) References Cited

U.S. PATENT DOCUMENTS

| | | | | |
|---|---|---|---|---|
| 755,497 | A | * | 3/1904 | Hyatt .................. 416/118 |
| 1,314,232 | A | * | 8/1919 | Wohr ................... 416/119 |
| 6,688,842 | B2 | * | 2/2004 | Boatner ................. 415/4.2 |
| 2004/0057830 | A1 | * | 3/2004 | Boatner ................. 416/61 |
| 2004/0228729 | A1 | * | 11/2004 | Migler .................. 416/119 |

* cited by examiner

*Primary Examiner*—Edward Look
*Assistant Examiner*—Ryan H Ellis
(74) *Attorney, Agent, or Firm*—James W. Hiney

(57) ABSTRACT

A wind driven power system employing multiple arms adapted to rotate about a central structure, each arm having a series of panels pivotally connected thereto and adapted to open and close as the system rotates to perpetuate the rotational movement and to produce energy.

6 Claims, 6 Drawing Sheets

US 7,618,237 B2

WIND DRIVEN POWER SYSTEM

This invention relates to a wind driven power system which is simple to make, which requires very little maintenance and which is very effective in producing power from wind.

BACKGROUND

The use of wind driven systems to produce power have been used, in one form or another, by mankind since the early history of Europe. The most common system which comes to most individuals minds when they think of wind power is the windmill, as built in the hundreds by the Dutch in Holland to harness the winds off the English Channel, to pump water in and out of canals and channels used for both transportation and irrigation.

The windmill is a unique piece of equipment and allows the wind to drive a propeller of sorts, mounted on the supporting structure, which, through right angles and reduction gearing, drives a shaft controlling the operation of a water wheel or pump for power generation. The typical American farm had, some many years ago, a windmill which was used to pump well water for both human and animal drinking purposes and crop irrigation demands.

THE PROBLEM

Typical of wind driven systems, have a propeller which requires a large amount of maintenance which has a top speed limited by the very mounting it sits in on a supporting structure. The prop, as it were, is mounted on a horizontal shaft to a bevel gear which redirects the energy from horizontal to vertical. This gear provides another weak point in the system and needs a lot of maintenance and lubrication. It has always been a goal of those who would harness the wind to design a system which is cheap and requires very little maintenance. The modern wind farm that have been established out West and which are now planned for the East coast of the United States, are very costly, high maintenance operations and require an enormous amount of capital to establish. The result is that the electrical power generated is not as cheap as it could be.

THE PRIOR ART

There have been attempts to establish simple vane panel systems in the past but none have been commercialized due to the awkwardness of their design.

The patents to Labrador, U.S. Pat. Nos. 4,756,666 and 4,859,146, show a windmill using panel vanes but they are mounted upon a continuous track system and is not very efficient. The patent to Poeta, U.S. Pat. No. 4,037,983, shows a wind motor but which employs multiple rotating rotors rather than panel vanes thereby complicating the device and making it more expensive. Brattland, U.S. Pat. No. 1,568,718, shows a series of rotating motors within a V-shaped conduit. Nilberg, U.S. Pat. No. 4,175,910, shows a system using a wind motor as a windbreak. Again, like Labrador, it uses a continuous system which is complicated and inefficient. Patton shows another system using a series of vanes within duct work which is unlike the present system. Copies of these reference prior art are enclosed.

Contrasting these prior art devices with the instant invention, one immediately notices how simple and efficient it is. The solves the problem that other proposed systems wished to solve but did not. The system uses rotatable panel vanes mounted on frame struts. By the use of rods which either directly impact the panels or which have curved extensions which hit the struts when the wind tries to impact the panel surface in a negative mode and thereby keep the panels edge-on to the wind when the main vertical member rotates thereby allowing the opposite panel to be beam-on to the wind and to gradually present its front to the wind as it rotates through 360 degrees continuously.

This unique design allows the vane panel system to present its vanes flat surface perpendicular to the wind and allows it to "fall-off" as it continues to rotate. "Fall-off is a sailing term meaning to gradually move the plane of the sail more in alignment with the direction of the wind to lessen the propulsion effect. To prevent the flat surface from swinging around the other side of the vertical axis and being perpendicular to the wind again, the panels are allowed to rotate and are stopped after rotating 90 degrees of rotation thus presenting the edge to the wind thus eliminating any pressure of the wind against the panels. The panel could be said to be on a "close tack" (another sailing term meaning the bow is pointed close to the point where the wind is coming from. As the panels rotate, the wind hits the reverse side causing them to re-rotate back to their original position for the force to drive them once again.

The system can be sued to drive generators, lights, pumps and other stationary gear well as land craft and water born craft. In lieu of using the wind to drive a conventional sailboat, the craft could be driven by this invention which would convert wind energy into rotational energy to drive a propeller.

OBJECTS OF THE INVENTION

Accordingly, it is an object of this invention to provide an inexpensive, highly efficient wind driven system for supplying power for a variety of needs.

It is another object of this invention to provide a wind driven system employing a series of panels and strut members which cause a shaft to endlessly rotate with a the force of wind power.

It is still another object of this invention to provide a wind driven power system for generating power for pumps, generators and other stationery equipment.

Yet another object of this invention is to provide a wind driven system for propelling water craft and land craft.

Another object of this invention is to provide a simple, easy to maintain system for converting wind energy into mechanical energy.

These and other objects will become apparent when reference is had to the accompanying drawings FIG. 1 is a three dimensional view of one embodiment of the invention.

DETAILED DESCRIPTION OF THE DRAWINGS

Figure 1:
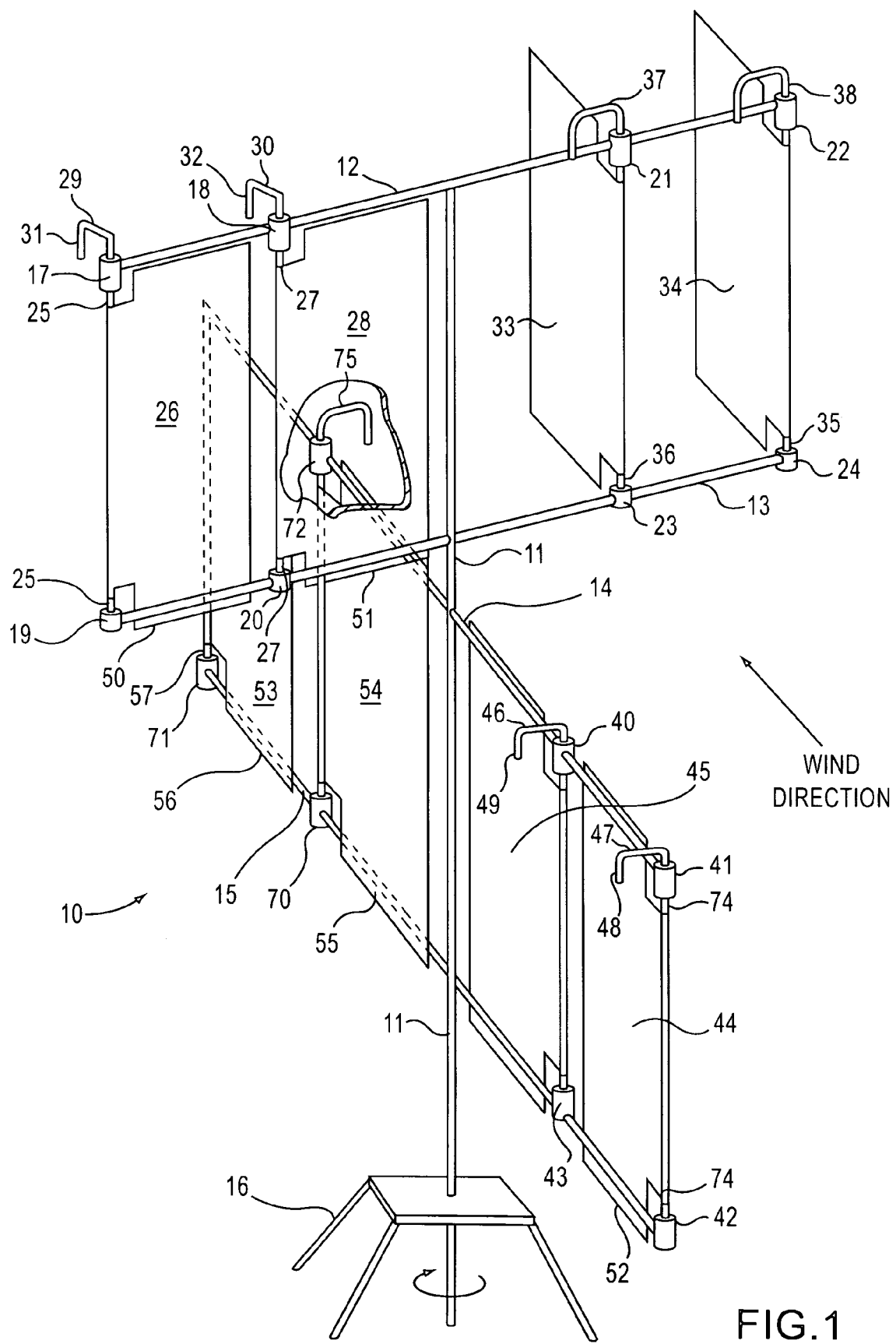

Referring now to FIG. 1 there is shown the overall system 10. A central vertical rod 11 is positioned so as to rotate in base member 16. Member 11 has a first pair of parallel extending strut members 12 and 13 attached thereto and extending therefrom. These strut members rotate with member 11. A second pair of extending struts 14 and 15 are also attached to member 11 and extend from it at a ninety degree angle from arms 12 and 13. Each pair of struts has several panel vanes such as 26, 28, 33 and 34 mounted therebetween. The lower struts have panel vanes 44, 45, 53 and 54 mounted therebetween. These panel vanes are adapted to rotate on each pair of struts approximately 90 degrees to accommodate the change in their flat surfaces to the wind direction as member 11, together with the struts, rotates by the force of the wind impinging upon the flat surface of the panel vanes.

Mounted upon the top struts are journals 17, 18, 19, 20, 21, 22, 23 and 24. Mounted upon the lower struts are journals 40, 41, 42, 43, 70, 71, 72 (shown in the breakaway section behind panel 28) and 73 (not shown as it is behind panel 26). These journals receive vertical pivot rods such as 25 on panel 26, 27 on 28, 36 on panel 33, 35 on panel 34, 74 on panel 44 and so on. The pivot rods are affixed to the edge of each panel vane to allow it to rotate about an axis between an upper and lower journal, for instance journals 17 and 19. The top portion such as 29, 30, 37, 38, 47, 46, and 75 of each rod is bent to provide a hook portion such as 31, 32, 48 and 49 and so on. The hook portion engages the upper strut when the panel rotates are caused by the relative shift in the direction of the wind as the panels rotate. This prevents the panels from rotating more than 90 degrees to insure that they remain in a stable condition and position as the entire assembly rotates. When they are again in a position to have the force of the wind at the side opposite where the hook portion is, they act as a sail and force the struts and consequently, the entire assembly, to rotate. The top portion of the rod on panel 54 can be seen through a break-away section of panel 28. The positioning of the panels on each pair of struts is such that the assembly is balanced. The assembly can function with only one pair of struts but it is more efficient with two or more pairs of struts, especially with an even number of pairs of struts.

Figure 2:
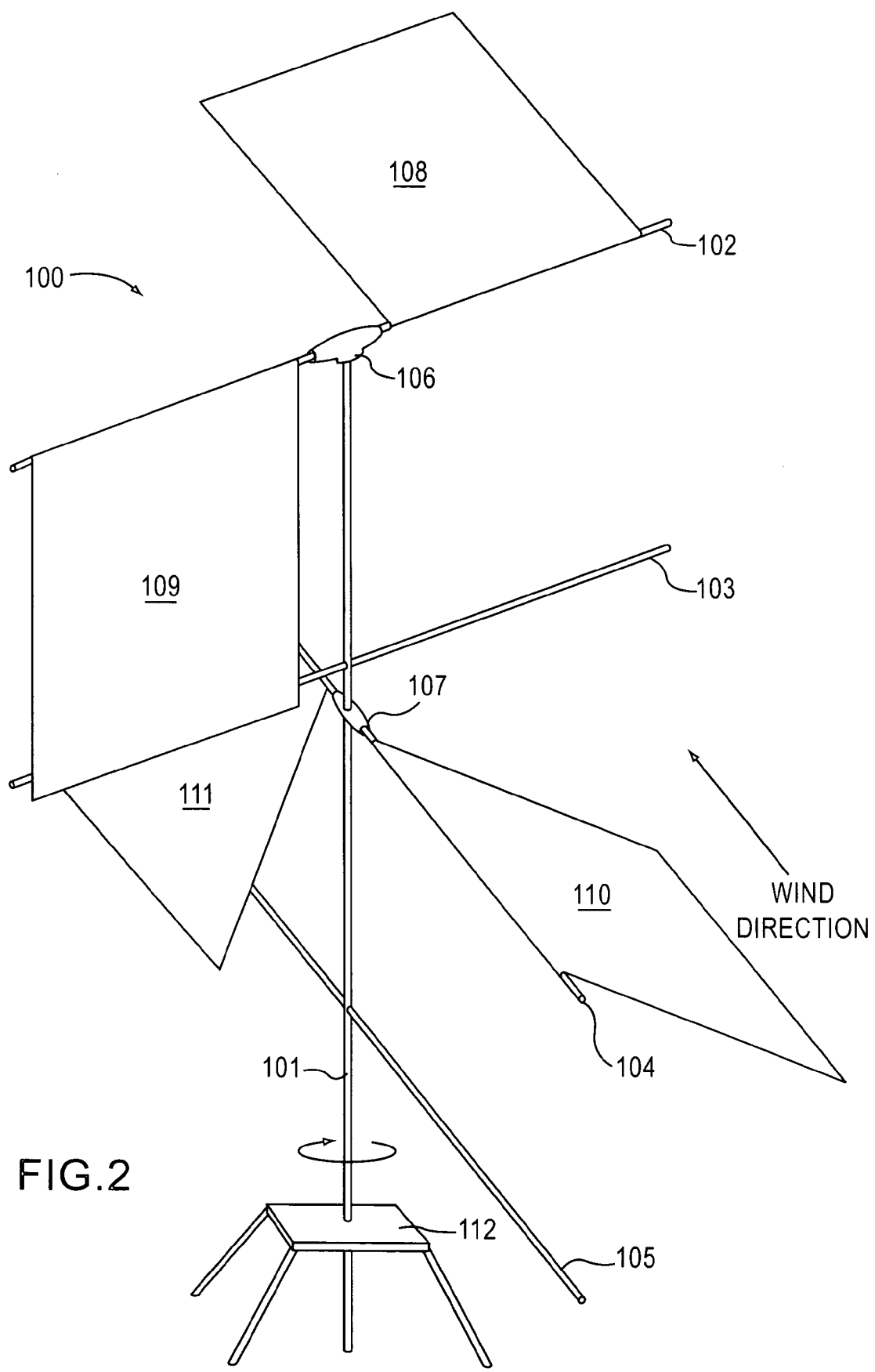
FIG. 2 is a three dimensional view of a second embodiment of the invention.

Referring now to FIG. 2 there is shown a second embodiment of the invention 100. It consists of a central vertical member 101, which rotates in a base 112 and has two pairs of struts, 102 and 103, and 104 and 105 mounted thereto. They are mounted so that struts 102 and 104 swivel on journals 106 and 107 and struts 103 and 105 are fixed thereto. Mounted on rotating strut 102 are panel vanes 108 and 109. These vanes are affixed to strut 102 and are positioned so as to be 90 degrees offset to one another. Likewise, panel vanes 110 and 111 are affixed to swiveling strut 104 in a 90 degree offset to one another. As the wind impinges upon vane 109, it forces the lower edge thereof up against strut 103 and vane 108 is edge-on to the direction of the wind. As the assembly rotates the panels 108 and 109 change position and now panel 108 is forced against lower strut 103 and the panel 108 is edge-on to the wind. The operation of the lower panel vanes 110 and 111 act in a similar manner. As the assembly is balanced if affords the wind a panel to push against for each 90 degree quadrant of the rotation of the assembly. The lower edge of each vane hits against the fixed strut and the assembly in this configuration does not need hook members.

Figure 3:
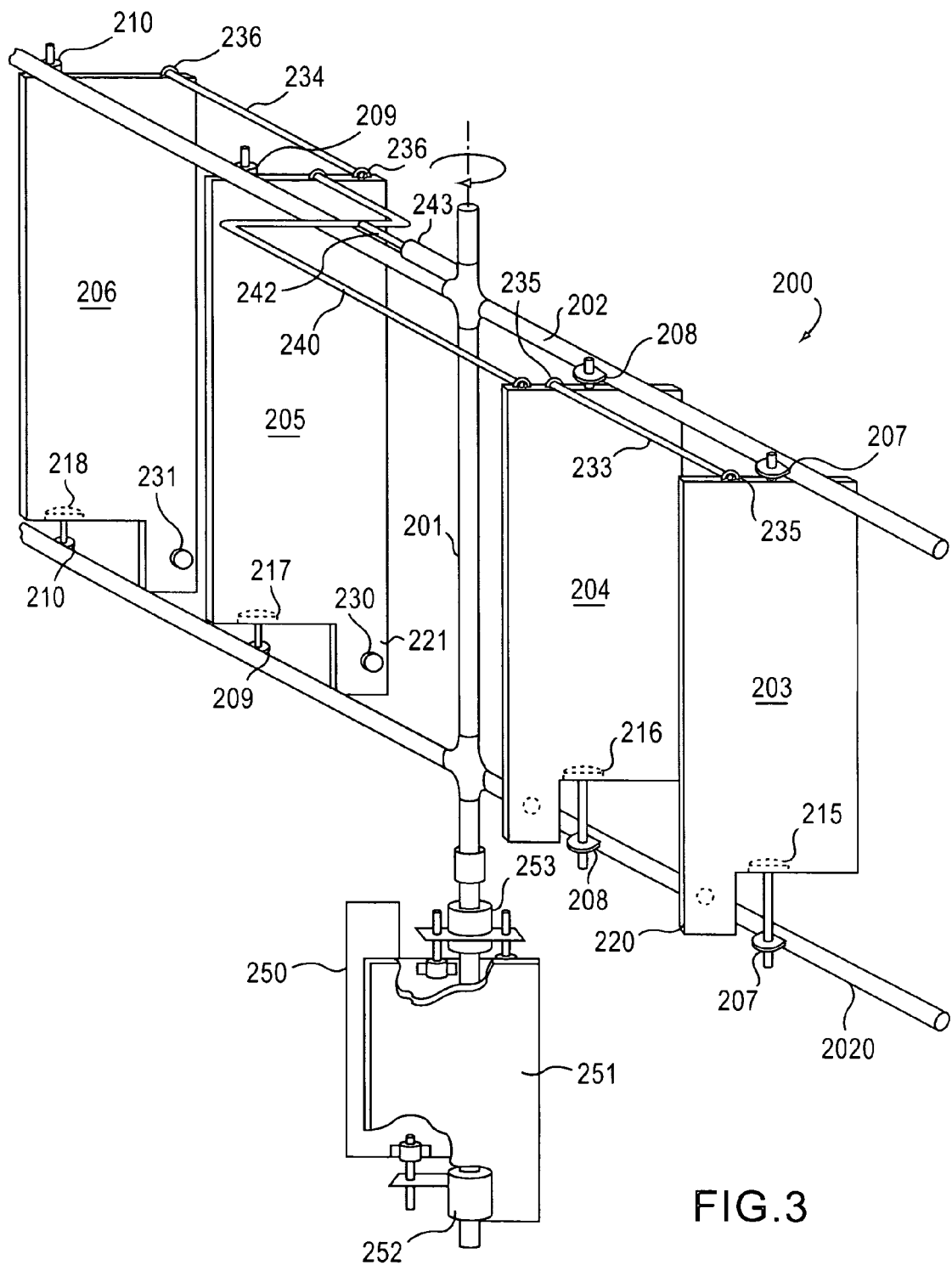
FIG. 3 is a three dimensional view of a third embodiment of the invention.
Figure 4:
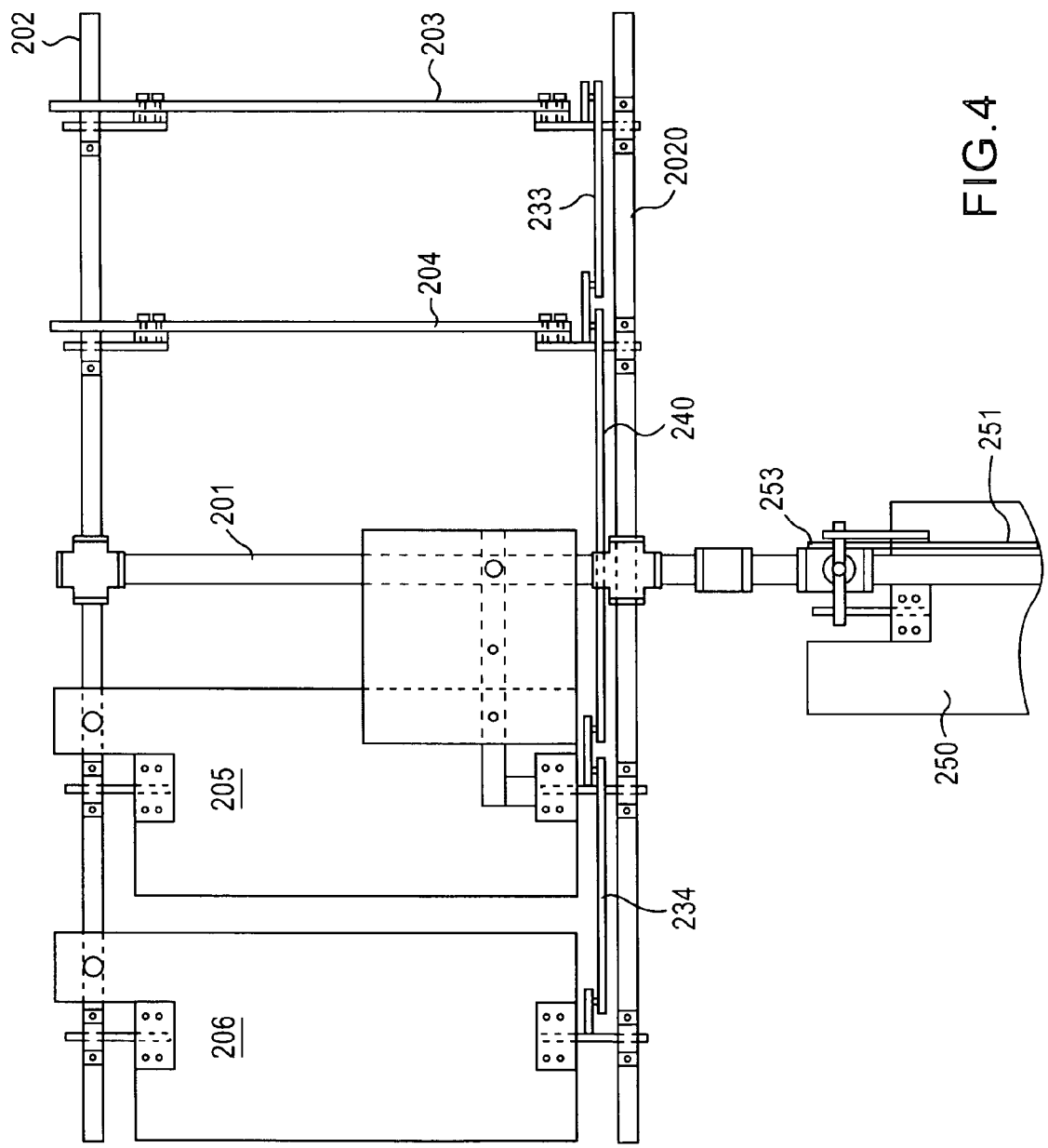
FIG. 4 is a cross sectional view of the device of FIG. 3 taken along line 4-4.
Figure 5:
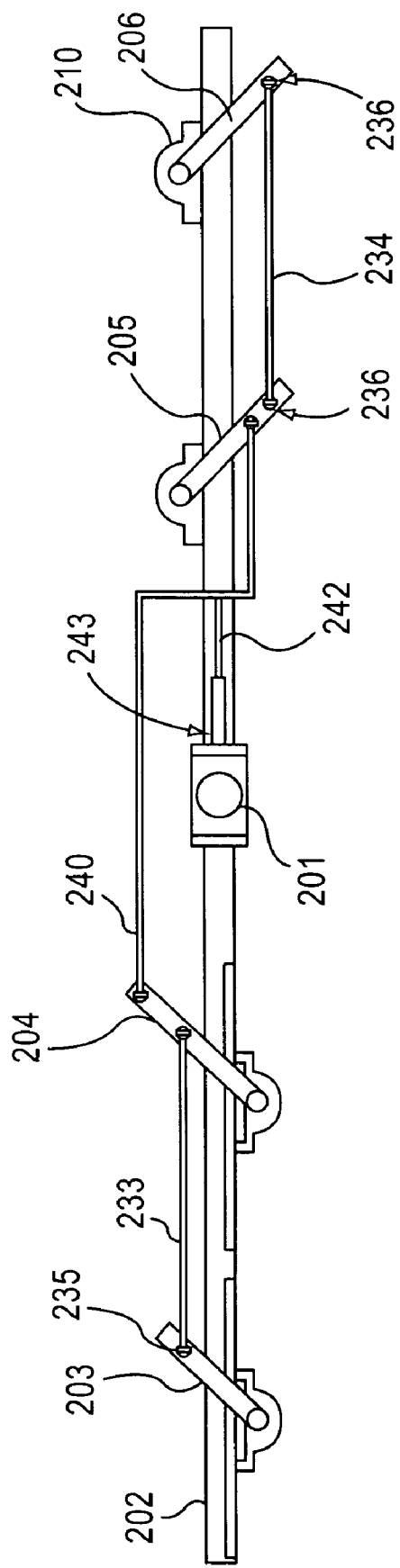
FIG. 5 is a front view of the device of FIG. 3.

Referring now to FIGS. 3, 4 and 5 there is shown a third embodiment of the device generally referred to as 200. Mounted upon a central shaft 201 are horizontally extending struts 202 and 2020 upon which are rotatably affixed panel vanes 203, 204, 205 and 206. These panel vanes are affixed upon the struts by means of bushing members such as 207, 208, 209 and 210. These bushings, each pair of which are mounted on opposite sides of each strut member, allow each panel vane to rotate around rods 211, 212, 213 and 214 which are affixed to the panel vanes by additional attachment members such as 215, 216, 217 and 218 as shown in FIG. 4. It is understood that there is an attachment member such as 215 on the top edge and bottom edge of each panel vane or, alternatively, the panel vanes can be attached directly to the rod members 222, 223, 224 and 225. The vanes have extending portions such as 220, 221 with rubber snubbers such as 230 and 231 thereon to cushion the impact of the extending vane portion impacting the lower strut members 201 and 202. Each pair of vanes are designed to engage the wind as shaft 201 rotates and, in turn, disengage as the rotation continues much as in the other embodiments.

The two pairs of panel vanes are connected to one another by rods 233 and 234 which are connected atop the edge of each panel vane by a ball joint such as 235 and 236. Connecting the two pairs of vanes is a central connecting rod 240 which is connected to the top edge of each innermost panel vane by a ball joint such as 241. This rod connects the two pair of vanes to rotate together. Pivotally connected to road 240 is a piston rod 242 which is connected to a shock absorber 243 which can act to slow the device if the wind speed is too much. This shock absorber can act as a speed control to set the allowable speed of the device.

Located on the bottom of shaft 201 is another pair of panel vanes, 250 and 251 which as shown, panel 251 is cut away in two places to show the attachment of the auxiliary vanes to the shaft 201, The vanes are mounted atop collars 252 and 253 which are mounted to the central shaft to support the vanes on shaft 201.

Figure 6:
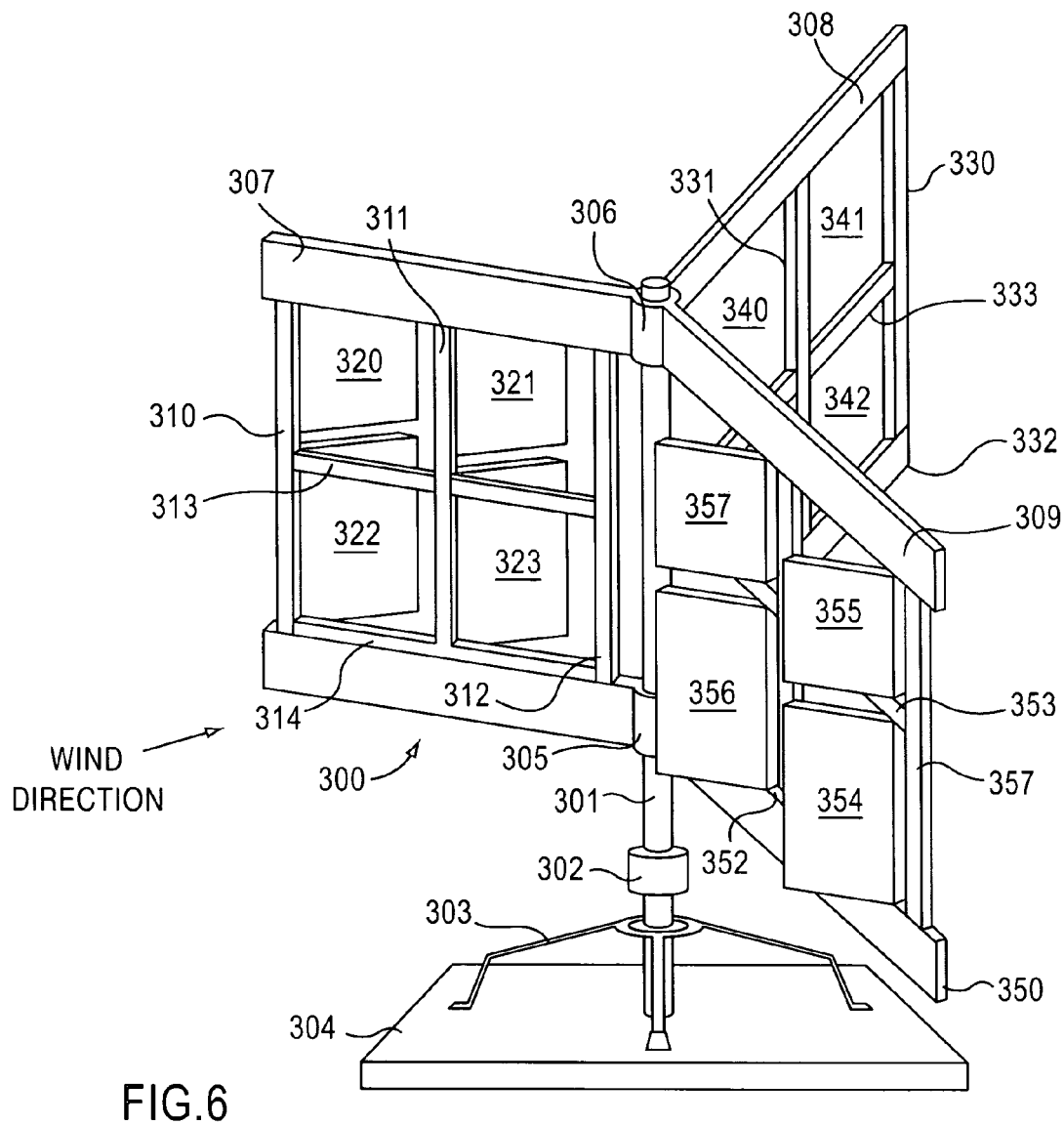
FIG. 6 is a three dimensional view of a fourth embodiment of the invention.
Figure 7:
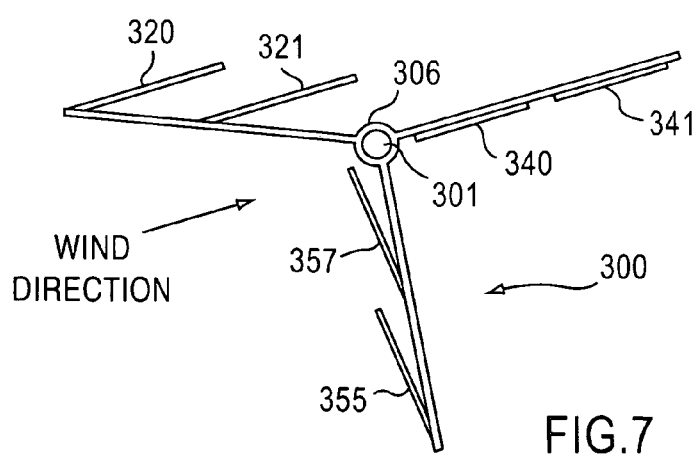
FIG. 7 is a top view of the fourth embodiment of the invention.

Referring now to FIGS. 6 and 7 there is shown a fourth embodiment of the invention noted generally as 300. A central shaft 301 is positioned, via a coupling 302 to a support member with legs 303 which support the invention atop base 304. Mounted atop the device is member 306 which is fashioned to pivot around shaft 301 at 306 and at 305. The three upper and lower members 307, 308 and 309 have corresponding lower members 350, 314 and 332. Mounted between the upper and lower pivoting members are vertical members 310, 311, 312, 330, 331, 357 and 362. Mounted across the vertical members and forming square openings therewith are horizontal members 313, 333 and 353. Pivotally mounted along one vertical edge in the square openings formed by the vertical and horizontal members are panes adapted to swing outwards with the wind and close when the wind is against them. The panels are shown as 320, 321, 322, 323, 340 341, 342, 354, 355, 356, and 357. There is one additional panel behind panel 357 which cannot be seen in this view. The pivoting means is merely are pins attached to the top and bottom of each panel along their vertical side which pin is fixed in a hole in the lower member such as 313 and 314. Other suitable pivoting means can be used but the idea is to allow the panes to swing open and closed as the entire structure rotates as shown in FIG. 7 which is a plan view of this embodiment showing the alignment of the panes related to wind direction. Shaft 301 is connected to a conventional shaft generator by a direct coupling such as 302 or by a belt or other conventional mechanism to convert rotational energy to electric energy.

The vertical rotating members in each embodiment may be connected in such a way as to drive pumps, compressors, and other machinery and also may be used as a new sail arrangement to propel sailboats with propellers. The key would be converting the wind energy to mechanical energy which has never been done before in sailboats.

While certain changes and modifications may occur to those of ordinary skill in The art, it is submitted that the claims appended hereto will encompass such obvious changes and modifications.

The invention claimed is:

1. A vertical shaft wind driven power generating system, said system powered by the wind with movable vanes, said system comprising
   a. a vertical axis member for rotation about a vertical axis,
   b. a base member supporting said vertical axis member,
   c. at least two frame members on said vertical axis member and including two parallel strut members,
   d. each frame member consisting of a plurality of vane panels, each panel having a flat wind driven surface and edges, said vane panels being pivotally mounted on said frame between said parallel strut members to rotate therebetween through approximately ninety degrees, at least two vane panels on each frame member and said frame members being mounted 180 degrees apart from one another on said vertical axis member,
   e. journals mounted upon both parallel struts, and vertical rod means on said vane panels and extending through said journal to aid panels to alternately position their wind driven surfaces and their edges in the direction of the wind so as to continually rotate with the force of the wind on the surface of some of the vane panels, turning the vertical axis member, and
   f. each vertical rod having one bent portion extending beyond one of the journals to provide, in cooperation with the adjoining strut, to limit the rotation of each rod and accompanying panel member to 90 degrees.

2. A system as in claim 1 wherein said curved continuation of said rod abuts the top strut of each frame member.

3. A system as in claim 1 wherein said top and bottom strut members are parallel to one another and said vane panels are square.

4. A system as in claim 3 wherein said means to alternately present the surfaces and edges of said vane panels to the wind are a series of rods attached to a vertical edge of each vane panel and pivotally mounted to both the top and bottom struts of said frame member to allow for rotation of said panels around said rods, said rods having an extension which is configured to abut the top frame strut after the panel has rotated ninety degrees, thereby keeping the edge of said panel to the wind when the system swings into the wind on that part of its rotation.

5. A system as in claim 1 wherein there are multiple frame members mounted one atop the other on said vertical axis member and there are multiple vane panels on each of said frame members, said frame members mounted atop one another being offset by 90 degrees from the one below it.

6. A system as in claim 1 where there are at least two said panels on said frame member, one on each side of the vertical axis member so as to balance the system as it rotates.

* * * * *